(12) United States Patent
Rawson et al.

(10) Patent No.: US 8,006,380 B2
(45) Date of Patent: Aug. 30, 2011

(54) METHOD OF REPLACING DAMAGED AEROFOIL

(75) Inventors: Martin Rawson, Derby (GB); Andrew T Webster, Leicester (GB)

(73) Assignee: Rolls-Royce plc, London (GB)

( * ) Notice: Subject to any disclaimer, the term of this patent is extended or adjusted under 35 U.S.C. 154(b) by 1437 days.

(21) Appl. No.: 11/127,099

(22) Filed: May 12, 2005

(65) Prior Publication Data

US 2005/0274010 A1 Dec. 15, 2005

(30) Foreign Application Priority Data

Jun. 9, 2004 (GB) .................................. 0412775.9

(51) Int. Cl.
  *B23P 6/00* (2006.01)
(52) U.S. Cl. ............... 29/889.1; 29/889.21; 29/889.7; 29/402.09; 29/402.11; 29/402.13
(58) Field of Classification Search .............. 29/889.1, 29/889.21, 889.23, 889.7, 888.025, 402.03, 29/402.08, 402.9, 402.13, 402.09, 402.16, 29/402.11, 402.12, 402.14; 228/112.1, 119, 228/212, 44.3
See application file for complete search history.

(56) References Cited

U.S. PATENT DOCUMENTS

| | | | | |
|---|---|---|---|---|
| 4,509,673 A * | 4/1985 | Schmidt et al. | ............... | 228/212 |
| 4,873,751 A * | 10/1989 | Walker et al. | ............... | 29/889.1 |
| 4,883,216 A * | 11/1989 | Patsfall | ............... | 228/119 |
| 4,934,583 A * | 6/1990 | Patsfall | ............... | 228/44.3 |
| 5,072,871 A * | 12/1991 | Moracz et al. | ............... | 228/193 |
| 5,109,606 A * | 5/1992 | DeMichael et al. | ......... | 29/889.1 |
| 5,174,715 A * | 12/1992 | Martin | ....................... | 415/209.4 |
| 5,191,711 A * | 3/1993 | Vickers et al. | ............. | 29/889.21 |
| 5,197,190 A * | 3/1993 | Coolidge | ..................... | 29/889.1 |
| 5,225,246 A * | 7/1993 | Beers et al. | .................... | 427/252 |
| 5,551,623 A | 9/1996 | Collot | | |
| 5,553,370 A * | 9/1996 | Pepe | ............................ | 29/889.1 |
| 5,701,669 A * | 12/1997 | Meier | ......................... | 29/889.1 |
| 5,755,031 A * | 5/1998 | Baumgarten et al. | ........ | 29/889.1 |
| 5,865,364 A | 2/1999 | Trask | | |
| 6,095,402 A | 8/2000 | Brownell | | |
| 6,106,231 A * | 8/2000 | Brainch et al. | .............. | 416/97 R |
| 6,115,917 A * | 9/2000 | Nolan et al. | .................. | 29/889.1 |
| 6,274,839 B1* | 8/2001 | Stone et al. | ................. | 219/76.12 |
| 6,438,838 B1* | 8/2002 | Meier et al. | .................. | 29/889.1 |
| 6,478,545 B2* | 11/2002 | Crall et al. | ................ | 416/213 R |
| 6,485,780 B1* | 11/2002 | Sangeeta et al. | .............. | 427/180 |
| 6,568,077 B1* | 5/2003 | Hellemann et al. | .......... | 29/889.1 |

(Continued)

FOREIGN PATENT DOCUMENTS

EP 0 086 964 A 1/1983

(Continued)

*Primary Examiner* — David P Bryant
*Assistant Examiner* — Ryan J Walters
(74) *Attorney, Agent, or Firm* — Jeffrey S. Melcher; Manelli Selter PLLC

(57) ABSTRACT

A method of replacing a damaged blade (12A) of an integrally bladed rotor assembly (10) including a disc (14) and a plurality of blades (12) extending outwardly from the disc (14) includes the steps of; removing the damaged blade (12A) to leave a blade stub (16) projecting from the disc (14); depositing a collar (22) of metal around the blade stub (16) at a position physically separated from the disc (14); attaching a replacement blade (12B) to the stub (16) by linear friction welding; and removing the collar (22). A body (20) of a material may be deposited between the disc (14) and the collar (22) to protect the disc (14) from damage.

16 Claims, 2 Drawing Sheets

U.S. PATENT DOCUMENTS

| | | | |
|---|---|---|---|
| 6,616,408 B1 * | 9/2003 | Meier | 416/193 A |
| 7,303,374 B2 * | 12/2007 | Li et al. | 416/61 |
| 7,363,707 B2 * | 4/2008 | Powers | 29/889.1 |
| 7,389,583 B2 * | 6/2008 | Lundgren | 29/889.22 |
| 2002/0127108 A1 | 9/2002 | Crall | |

FOREIGN PATENT DOCUMENTS

| | | |
|---|---|---|
| EP | 1 239 116 A | 2/2004 |
| GB | 2 181 374 A | 4/1987 |
| GB | 2 218 016 A | 11/1989 |

* cited by examiner

METHOD OF REPLACING DAMAGED AEROFOIL

FIELD OF THE INVENTION

The invention relates to a method of replacing a damaged blade of an integrally bladed rotor assembly, particularly for a gas turbine engine.

BACKGROUND OF THE INVENTION

Compressors and turbines of gas turbine engines such as those used in aero engines typically include a plurality of rotor and stator vane assemblies. The rotor assemblies are designed to impart work into gases passing through the compressor and extract work from the gases passing through the turbine. The stator vane assemblies help to direct the working gases entering or exiting the rotor assemblies and thereby increase efficiency of the engine.

Each rotor assembly includes a disc and a plurality of blades attached to the disc so as to extend radially outwardly therefrom. Conventionally, the blades have been attached to the disc by mechanical connections such as "fir tree" type connections where a fir tree shaped blade root is received within a complementary shaped recess in the disc. This means that the blade can be readily replaced in the event that it is damaged.

Recent developments have resulted in integrally bladed rotor assemblies or "blisks" in which the blades are formed integrally with the disc. These have the advantage of reduced weight as compared to a standard rotor assemblies and in improved aerodynamic efficiency. Such blisks are particularly applicable in the design of military aero engines.

In view of the nature of their applications, blisks are susceptible to damage that in some circumstances may require the replacement of a blade. In order to replace the blade, it must be removed by machining it off to leave a stub, and welding a new blade onto the stub by linear friction welding. This is a process whereby one part is held stationary while the other part is oscillated against it under load, the heat generated and the applied loads result in a weld, as material exudes from the edges of the joint. In the repair of blisks, the replacement blade is oscillated relative to the stationary disc, while a load is applied in the radial direction towards the disc. The blade is thereby joined to the disc.

Linear friction welding results in the consumption of material (which leaves the edges of the weld as flash) and in the recirculation of contaminants back into the weld during the process. This results in the necessity to machine off significant amounts of material around the weld. In view of this, blisks have conventionally been formed with oversized fillets at the disc and blade interface in order to allow a repair stub to be machined into the aerofoil profile should a replacement blade need to be attached through the linear friction welding process. However, this can prevent optimum design and produce unnecessary weight.

SUMMARY OF THE INVENTION

According to the invention there is provided a method of replacing a damaged blade of an integrally bladed rotor assembly including a disc and a plurality of blades extending outwardly from the disc, the method including the steps of:
  removing the damaged blade to leave a blade stub projecting from the disc;
  depositing a collar of metal around the blade stub at a position that it is physically separated from the disc;
  attaching a replacement blade to the stub by linear friction welding; and
  removing the collar.

The collar provides support for the stub during the friction welding process, with no external clamping being provided for the stub or the collar. As the collar is physically separated from the disc it prevents damage to the surface of the disc.

The rotor may include an original weld plane defining the position where the damaged blade was welded to the disc, and the damaged blade is preferably removed radially outwardly of the original weld plane. Preferably, the collar is deposited such that it surrounds the original weld plane.

Preferably, the collar is deposited by building up the collar layer by layer. The collar may be annular, including a central opening through which the blade stub passes.

The method may include the step of depositing a body of material around the blade stub, adjacent to the disc, this material being different from that of the collar. Preferably, the material is a polymer. However, the material could be a low melting point metal or a coating.

The body of material may be annular, including a central opening through which the blade stub passes.

The body of material may be deposited before the deposition of the collar.

The collar may be deposited onto the body of material such that it sandwiches the body of material between itself and the disc. However, the collar may be deposited directly onto the stub.

The linear friction welding process may involve oscillating the blade tangentially relative to the disc.

Preferably, the linear friction welding process is carried out such that a new weld plane is created between the replacement blade and the rotor, the new weld plane being located in substantially the same position as the original weld plane.

The collar may be removed by machining. Preferably, the resulting blade has substantially the same shape as the original blade.

BRIEF DESCRIPTION OF THE DRAWINGS An embodiment of the invention will be described for the purpose of illustration only with reference to the accompanying drawings in which.

DETAILED DESCRIPTION OF THE INVENTION

Figure 1:
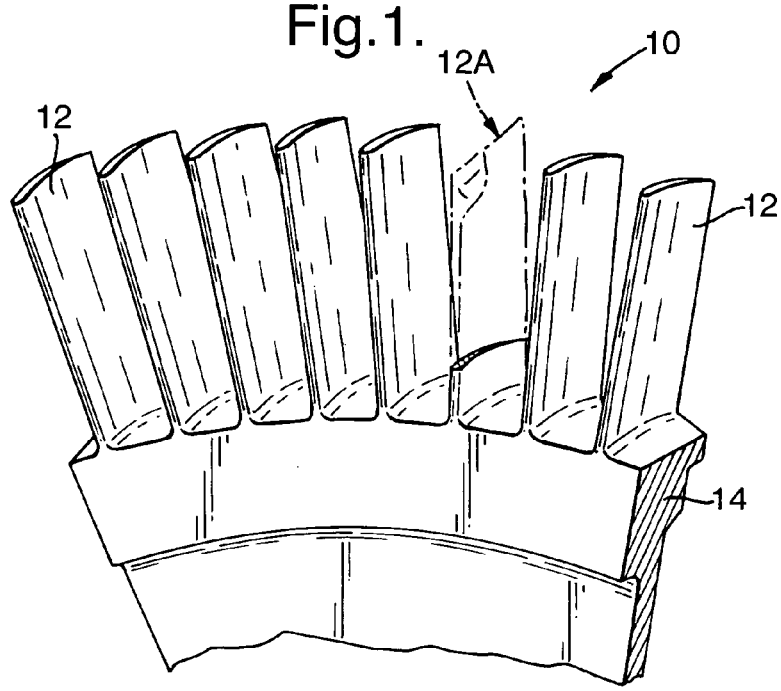
FIG. 1 is a diagrammatic perspective view of part of an integrally bladed rotor assembly.

Referring to FIG. 1, there is illustrated a part of an integrally bladed rotor assembly 10 which may be used in the compressor or turbine of an aero engine. The rotor assembly 10 includes a plurality of blades 12 attached to a disc 14 so as to extend radially outwardly therefrom. The blades 12 are typically of a titanium, nickel or steel alloy (a titanium 6-4 alloy commonly being used) and are attached to the disc 14 by linear friction welding. This involves holding the disc 14 stationary while a blade member (comprising the as yet unmachined/unfinished blade) is oscillated against the disc 14 under load. The blade member may be oscillated tangentially or axially against the disc. The heat generated by the oscillation together with the radially inward load results in the material of the blade member and disc becoming plastic. When the material subsequently cools back to a solid, bonds are formed and a weld is created between the disc 14 and the blade member. During the friction welding process, weld material ("flash") is extruded from the sides of the joint. The blade is subsequently machined into shape, the material at the edges of the weld being removed.

During the life of the rotor assembly 10, it is not uncommon for a single blade 12A to become significantly damaged and to require replacement. To replace the blade 12A, a new blade has to be attached using linear friction welding. The damaged blade 12A is removed so as to leave a stub 16 projecting from the disc 14. A new blade 12 may be welded onto the stub 16.

Linear friction welding is used to attach the new blade 12 to the stub 16. Flash is extruded during this process and must be controlled to ensure it flows smoothly out from the weld without any recirculation back into the weld. Preventing such recirculation avoids poor microstructure being formed in the weld. It is also necessary to remove any edge defects that are produced during the welding process. Consequently, a large surface area is required to allow a good weld to be formed and this creates a need to produce extra material around the stub, this material being removed by machining after the new blade has been welded into place. Thus, according to the prior art, the rotor assembly 10 is formed with oversized fillet areas between the disc 14 and the blades 12, such that enough material is available for the above process.

Figure 2:
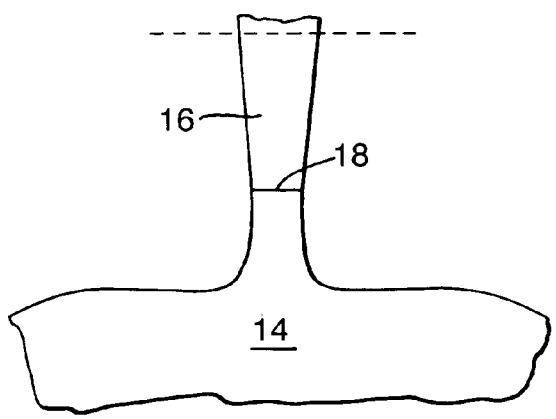
FIG. 2 is a sectional view of a blade of an integrally bladed rotor assembly, viewed looking down the engine axis and illustrating the removal of a damaged blade.

Referring to FIG. 2, a damaged blade 12 has been removed at the position indicated by the dotted line, leaving a stub 16 having an aerofoil profile. The blade 12 is removed at a position radially outwards of an original weld plane 18 created when the original blade 12 was friction welded to the disc 14.

Figure 3:
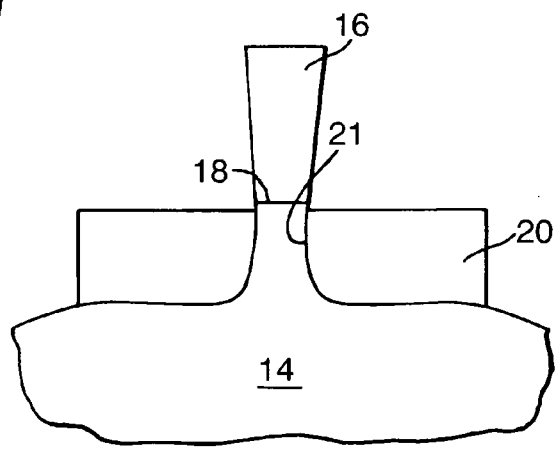
FIG. 3 is a similar view to FIG. 2, but illustrating a step in a process according to the invention.

In one embodiment of the present invention, shown in FIG. 3, a body 20 of a material is deposited around a base region of the blade stub 16. The body 20 may comprise a polymer, ceramic or metallic material. The body 20 is in contact with the disc 14, and may form approximately a ring shape, including a central opening 21 for the stub 16. The body 20 extends radially to a position slightly radially inwards of the original weld plane 18.

Figure 4:
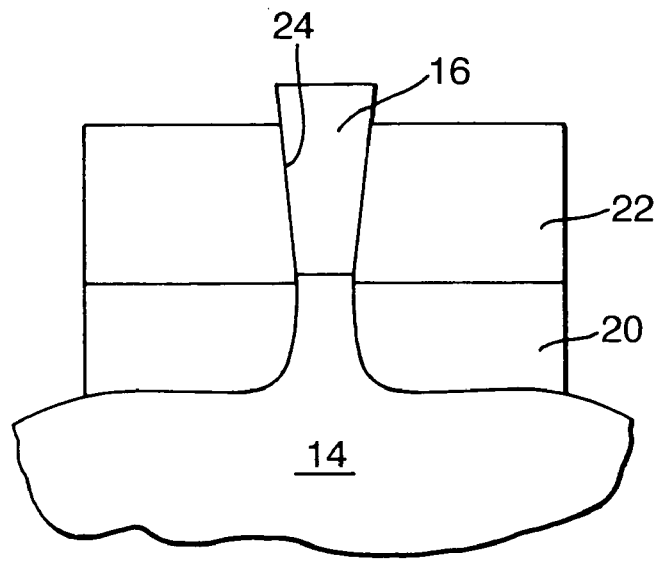
FIG. 4 is a view similar to FIG. 3, illustrating a further step in the process of the invention.

A metal collar 22 is then deposited radially outwardly of the body 20, FIG. 4. The metal collar 22 is a relatively low melting point alloy, such as a bismuth alloy. The collar 22 is deposited by a material addition method such as shaped metal deposition, laser welding, plasma, laser powder or laser wire deposition.

It will however be appreciated that the collar 22 may be deposited prior to the deposition of the body 20. In this case the collar 22 would be deposited directly onto the blade stub 16 at a position adjacent to the original weld plane 18 but physically separated from the disc 14. The collar 22 is generally ring shaped, including a central opening 24 for the stub 16.

Once the metal collar 22 is in place, the desired stub profile, as defined in the original manufacturing documents, is machined into the body 20 and collar 22 combination to leave a stub 16 which is ready for linear friction welding.

Figure 5:
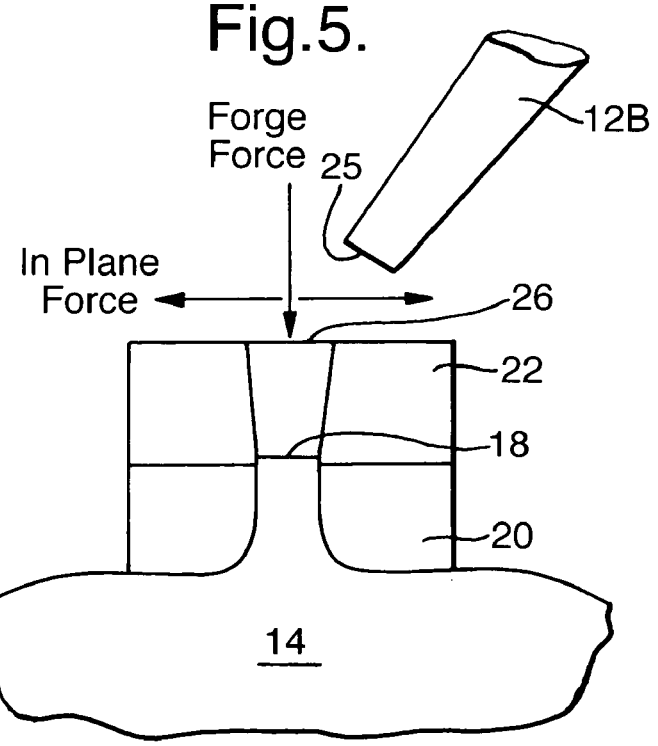
FIG. 5 is a further view similar to that of FIGS. 3 and 4, illustrating a further step in the process of the invention.

Referring to FIG. 5, a new blade 12B may then be attached to the stub using the linear friction welding process. FIG. 5 indicates the forces involved. A planar, radially inner base 25 of the blade 12B is brought into contact with a planar, radially outer surface 26 of the blade stub 16. Relative linear motion is then effected between the base 25 of the blade 12B and the outer surface 26 of the stub 16. A force is also applied to the blade 12B in a radially inwards direction.

The motion of the base 25 of the blade 12B relative to the stub 16 results in frictional heat at the interface between the two components. This causes the temperature at the interface to rise to a value approaching, but below, the melting point of the material from which the blade is manufactured. The two surfaces are welded together, with weld flash being extruded from the weld interface between the two surfaces.

Subsequently, the metal flash is removed by machining. The body 20 is then chemically or mechanically removed (ensuring complete removal) and the final profile of the blade 12B is machined, this removing any heat affected material around the weld. The resulting repaired blade has substantially the same profile as the original undamaged blade.

The presence of the metal collar 22 supports the blade stub throughout the friction welding process. The blade stub therefore requires no additional clamping. This also ensures that edge defects caused by the linear friction welding process are present in the collar 22, which is subsequently removed, rather than in the blade. The use of a deposited metallic collar 22, which is physically separated from the disc 14, is advantageous because it has a relatively low heat input and therefore does not damage the blade or the disc 14. In addition, the body 20 acts as a barrier and ensures that the deposition of the collar 22 does not cause any molten metal to contact and damage the disc 14. The body 20 also supports the metal collar 22 under loading. As there is no interaction between the body 20 and the disc 14, the disc 14 is not adversely affected by the presence of the body 20.

The remote position of the metal collar 22, which is built up just below the initial weld plane 18, ensures that after linear friction welding, the material that might be affected by the heat from the shaped metal deposition process is kept to a minimum. This therefore requires minimum clean up to remove any heat affected material and blend in the new blade profile.

Using the above method, there is no need to have over large original blade stubs to accommodate repair stub profiles within the fillet radius of the finished blade. The body 20 and the collar 22 provides inbuilt support for the blade stub during the linear friction welding process and no external clamping is required. The body 20 also acts as a barrier between the collar 22 and the disc 14 and prevents damage to the surface of the disc 14.

Various modifications may be made to the above described embodiment without departing from the scope of the invention. For example, the materials and shapes of the collar 22 and the body 20 may be altered. Instead of a polymer for the body 20, a low melting point metal, a heat resistant coating or a shaped plate could be used.

We claim:

1. A method of replacing a damaged blade of an integrally bladed rotor assembly including a disc and a plurality of blades extending outwardly from the disc, the method including the steps of:

removing the damaged blade to leave a blade stub projecting from the disc;

depositing a body of material around the blade stub adjacent to the disc;

forming a collar of metal around the blade stub at a position that is physically seperated from the disc by depositing a molten metal, wherein the material of the body is different from that collar;

attaching a replacement blade to the stub by linear friction welding; and removing the collar.

2. A method according to claim 1 wherein the rotor assembly includes an original weld plane defining the position where a blade was welded to the disc and the damaged blade is removed radially outwards of the original weld plane.

3. A method according to claim 2 wherein the collar surrounds the original weld plane.

4. A method according to claim 1 wherein the metal is deposited by shaped metal deposition, plasma, laser powder, or laser wire deposition.

5. A method according to claim 1 wherein the collar is annular and includes a central opening through which the blade stub passes.

6. A method according to claim 1 in which the material of the body is a polymer or heat resistant coating.

7. A method according to claim 1 in which the body of material is deposited before the deposition of molten metal forming the collar.

8. A method according to claim 1 in which the metal forming the collar is deposited onto the body of material such that it sandwiches the body of material between itself and the disc.

9. A method according to claim 1 in which the linear friction welding process involves oscillating the blade tangentially relative to the disc.

10. A method according to claim 1 in which the collar is removed by machining.

11. A method according to claim 1 in which the resulting blade has substantially the same shape as the original blade.

12. A method according to claim 1, wherein the metal comprises a low melting point alloy.

13. A method according to claim 1, wherein the metal comprises a bismuth alloy.

14. A method of replacing a damaged blade of an integrally bladed rotor assembly including a disc and a plurality of blades extending outwardly from the disc, the method including the steps of:
    removing the damaged blade to leave a blade stub projecting from the disc;
    forming a collar of metal around the blade stub at a position that is physically separated from the disc by depositing a molten metal;
    depositing a body of material around the blade stub adjacent to the disc, said material being different from that of the collar;
    attaching a replacement blade to the stub by linear friction welding;
    and removing the collar,
    wherein the body of material is deposited before the deposition of the collar.

15. A method of replacing a damaged blade of an integrally bladed rotor assembly including a disc and a plurality of blades extending outwardly from the disc, the method including the steps of:
    removing the damaged blade to leave a blade stub projecting from the disc;
    forming a collar of metal around the blade stub at a position that is physically separated from the disc by depositing a molten metal;
    depositing a body of material around the blade stub adjacent to the disc, said material being different from that of the collar;
    attaching a replacement blade to the stub by linear friction welding;
    and removing the collar,
    wherein the body of material is deposited before the deposition of the metal to form the collar such that the body of material is sandwiched between the collar and the disc.

16. A method of replacing a damaged blade of an integrally bladed rotor assembly including a disc and a plurality of blades extending outwardly from the disc, the method including the steps of:
    removing the damaged blade to leave a blade stub projecting from the disc;
    depositing a body of material around the blade stub adjacent to the disc;
    forming a collar of metal around the blade stub at a position that is physically separated from the disc by depositing a molten metal by shaped metal deposition, plasma, laser powder, or laser wire deposition, wherein the material of the body is different from that of the collar;
    attaching a replacement blade to the stub by linear friction welding; and removing the collar.

* * * * *